Nov. 16, 1943.  E. F. SCHUBERT  2,334,443
TIRE PRESSURE INDICATOR
Filed Dec. 30, 1941  2 Sheets-Sheet 1
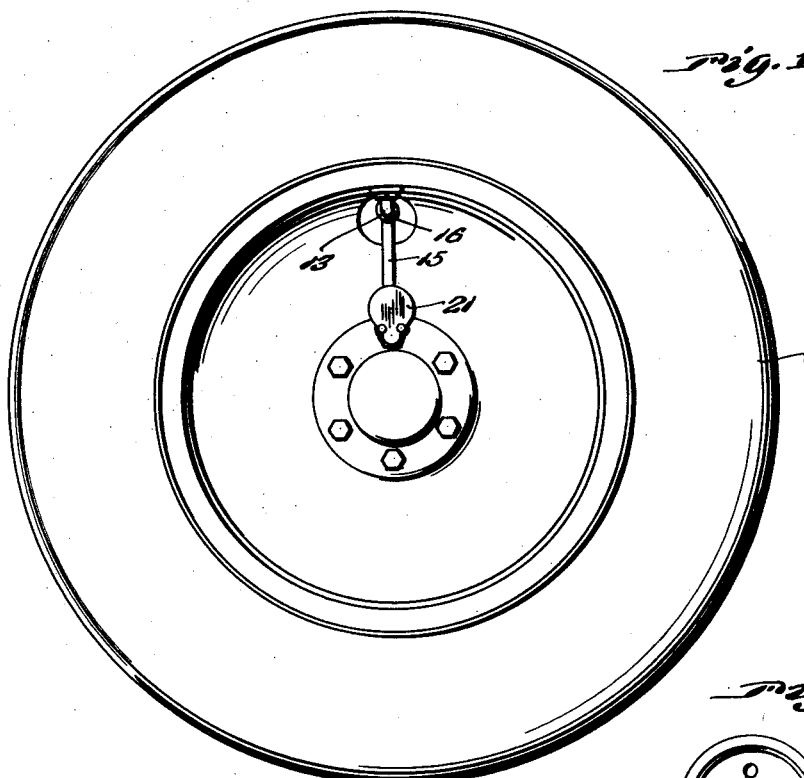
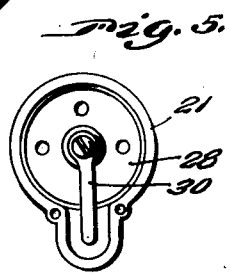
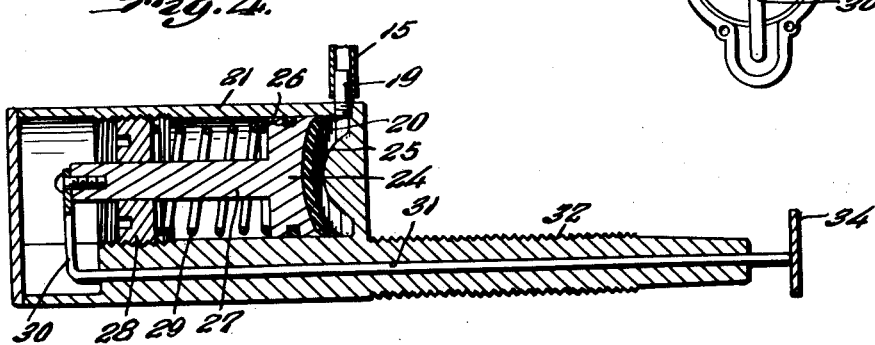
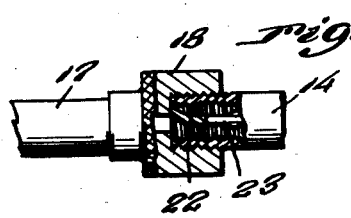
Inventor
Edward F. Schubert
By Clarence A. O'Brien
Attorney Nov. 16, 1943.   E. F. SCHUBERT   2,334,443
TIRE PRESSURE INDICATOR
Filed Dec. 30, 1941   2 Sheets-Sheet 2
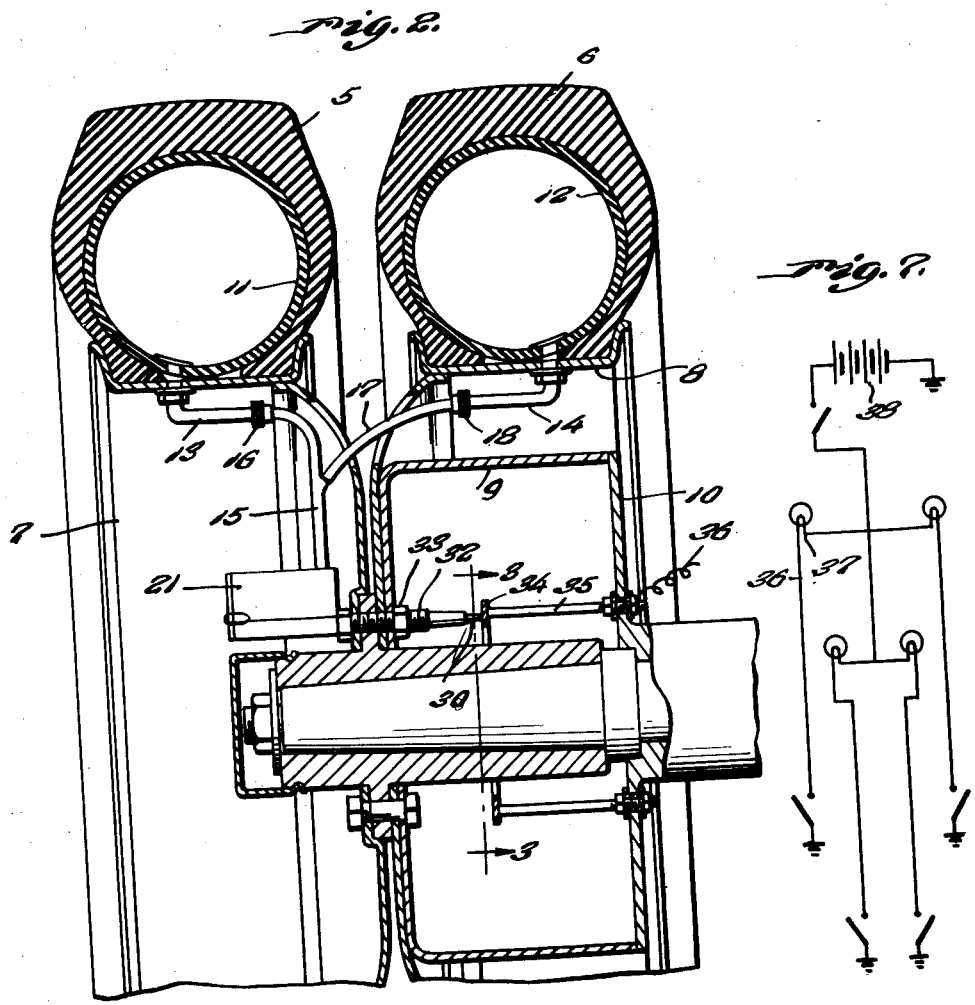
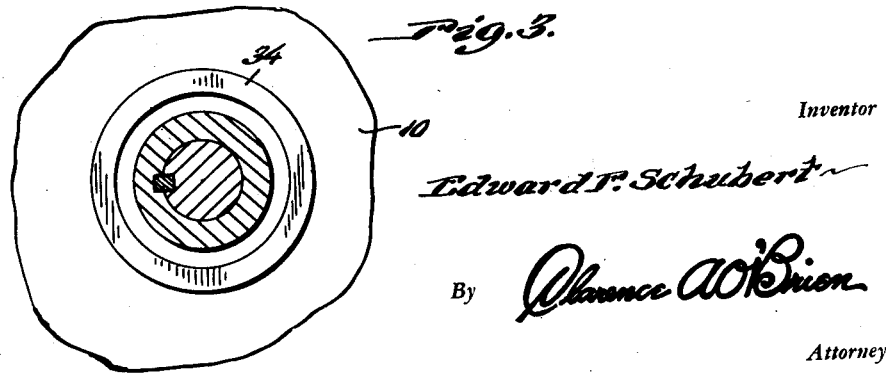
Inventor
Edward F. Schubert
By Clarence A. O'Brien
Attorney Patented Nov. 16, 1943

2,334,443

UNITED STATES PATENT OFFICE 2,334,443

TIRE PRESSURE INDICATOR

Edward F. Schubert, Keenesburg, Colo., assignor to Automatic Air Gauge, Inc., Keenesburg, Colo., a corporation Application December 30, 1941, Serial No. 424,982

3 Claims. (Cl. 200—58)

The present invention relates to new and useful improvements in tire pressure indicators designed particularly for use on dual vehicle tires and adapted for indicating to the driver when one or more of the tires drops below a certain predetermined pressure.

A further object is to provide a switch mechanism for each pair of dual tires, normally held in open position by the pressure of air in the tires and operable upon a deflation of either tire to close the circuit and energize a warning signal.

Another object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which:

Figure 1 is a side elevational view of a pneumatic tire equipped with my invention.

Figure 2 is a fragmentary transverse sectional view thereof.

Figure 3 is a sectional view taken substantially on a line 3—3 of Figure 2.

Figure 4 is a longitudinal sectional view through the switch housing.

Figure 5 is an end elevational view thereof.

Figure 6 is a detail in section of the tire valve deflating coupling, and

Figure 7 is a diagram of the electric circuit controlled by the switch for each set of tires.

Referring now to the drawings in detail, the numerals 5 and 6 designate a pair of pneumatic vehicle tires mounted on dual wheels 7 and 8 which include the brake drum 9 having the stationary backing plate 10.

The tires include the tubes 11 and 12 having individual valve stems 13 and 14 communicating therewith. A tube 15 is connected at one end to the valve stem 13 by a coupling 16 and a branch tube 17 leading from the tube 15 is connected to the valve stem 14 by a similar coupling 18. The other end of the tube 15 is connected to a nipple 19 leading to a cylinder 20 in a housing 21. The couplings 16 and 18 are provided with an internal stud 22 engaging the valve 23 of usual construction to maintain the valve open.

A piston 24 has a working fit in the cylinder 20 and is provided with a cup-shaped expansible packing washer 25 responsive to pressure of air entering the cylinder to expand the washer and seal the cylinder and the piston is also provided with a felt lubricating ring 26. The piston rod 27 is slidably mounted in a nut 28 threaded in the cylinder to form an adjustable abutment for one end of a coil spring 29 surrounding the stem and engaging the piston to urge the latter against the pressure of air in the cylinder.

To the outer end of the piston rod 27 is attached one end of an L-shaped contact member 30 which is slidably mounted in a bore 31 of a threaded stem 32 formed on the housing 21, the stem being mounted on the adjacent sides of the wheels 7 and 8 and projecting into the drum 9 and secured thereto by nuts 33.

The other end of the contact projects outwardly of the stem and is adapted to engage a conductor ring 34 secured in the drum by bolts 35.

A circuit wire 36 leads from the conductor ring to an electric lamp 37 or other signal device preferably mounted on the instrument panel of the vehicle. As shown in Figure 7 of the drawings one of the switch mechanisms above described is provided for each pair of dual wheels or individual wheel, as the case may be, and the lamps are connected in a circuit with the battery 38.

In the operation of the device, the normal pressure of air in the tires will compress the spring 29 and keep the contact 30 spaced from the conductor ring 34 and the circuit will thus remain open. The tires are in open communication with each other and should the pressure of the tires decrease, the spring 29 will overcome the pressure of air in the conductor ring and upon engagement therewith the circuit will be closed and the lamp energized to warn the driver of a partially or completely deflated tire.

It is believed the details of construction and manner of use of the device will be readily understood from the foregoing without further detailed explanation.

Having thus described the invention what I claim is:

1. A tire pressure indicator comprising an externally threaded stem adapted for securing to a vehicle wheel, a cylinder on one side of the stem and having communication with the tire, a spring-actuated piston having a working fit in the cylinder and responsive to pressure of air entering the cylinder from the tire, said stem having a bore therein, a contact slidably mounted in the bore with one end of the contact projecting beyond the stem, an angular extension on the other end of the contact and connected to the piston for movement thereby, and a stationary conductor ring carried by the vehicle in the path of said first-named end of the contact.

2. A tire deflation signal switch for vehicle wheels comprising a cylinder having a piston therein, one end of the cylinder being connected to a pneumatic tire, an externally threaded stem carried by the cylinder and providing attaching means for the cylinder to the wheel on which the tire is mounted, said stem having a bore, a contact slidable in the bore and projecting from each end thereof, said contact having a lateral extension at one end connected to the piston, and a conductor ring attached to a stationary part of the vehicle and disposed in the path of the contact.

3. A tire deflation signal switch for vehicle wheels comprising a cylinder having a piston therein, one end of the cylinder being connected to a pneumatic tire, an externally threaded stem carried by the cylinder at one side thereof and having a bore, extending parallel to the axis of the cylinder, means for securing the stem to a vehicle wheel, a contact slidably mounted in the bore and projecting from each end thereof, a lateral extension on one end of the contact connecting the contact to the piston, spring means urging the piston against pressure of air in the cylinder, and a conductor ring in the path of the other end of the contact.

EDWARD F. SCHUBERT.